(12) United States Patent
Chen

(10) Patent No.: US 11,961,299 B2
(45) Date of Patent: Apr. 16, 2024

(54) METHOD AND APPARATUS FOR GENERATING VIDEO FINGERPRINT

(71) Applicant: Alibaba Group Holding Limited, Grand Cayman (KY)

(72) Inventor: Changguo Chen, Hangzhou (CN)

(73) Assignee: Alibaba Group Holding Limited, George Town (KY)

( * ) Notice: Subject to any disclaimer, the term of this patent is extended or adjusted under 35 U.S.C. 154(b) by 585 days.

(21) Appl. No.: 17/170,447

(22) Filed: Feb. 8, 2021

(65) Prior Publication Data

US 2021/0166036 A1 Jun. 3, 2021

Related U.S. Application Data

(63) Continuation of application No. PCT/CN2019/099051, filed on Aug. 2, 2019.

(30) Foreign Application Priority Data

Aug. 9, 2018 (CN) .......................... 201810905169.X

(51) Int. Cl.
*G06V 20/40* (2022.01)
(52) U.S. Cl.
CPC .................................... *G06V 20/46* (2022.01)
(58) Field of Classification Search
None
See application file for complete search history.

(56) References Cited

U.S. PATENT DOCUMENTS

| | | | |
|---|---|---|---|
| 8,009,861 B2 | 8/2011 | Lu et al. | |
| 8,103,050 B2 | 1/2012 | Lefebvre et al. | |
| 8,259,177 B2 | 9/2012 | Gits et al. | |
| 8,532,382 B1 | 9/2013 | Ioffe | |
| 8,538,239 B2 | 9/2013 | Ikizyan et al. | |
| 8,611,422 B1 | 12/2013 | Yagnik et al. | |
| 8,611,689 B1 | 12/2013 | Yagnik et al. | |
| 8,655,056 B2 | 2/2014 | Singh et al. | |
| 8,761,452 B2 | 6/2014 | Bateman | |
| 8,989,376 B2 | 3/2015 | Ren et al. | |
| 9,135,674 B1 | 9/2015 | Yagnik et al. | |

(Continued)

FOREIGN PATENT DOCUMENTS

| | | |
|---|---|---|
| CN | 102073864 A | 5/2011 |
| CN | 102750339 A | 10/2012 |

(Continued)

OTHER PUBLICATIONS

Translation of International Search Report dated Oct. 28, 2019, from corresponding PCT Application No. PCT/CN2019/099051, 2 pages.

(Continued)

*Primary Examiner* — Leon Viet Q Nguyen
(74) *Attorney, Agent, or Firm* — Lee & Hayes P.C.

(57) ABSTRACT

A method and an apparatus for generating a video fingerprint are disclosed. The method includes: performing shot boundary detection on content of a video; determining a time duration of each shot according to positional points of the shot boundary, and compose the time duration of each shot into a shot boundary time slice sequence; and obtaining video fingerprint information according to the time slice sequence.

14 Claims, 8 Drawing Sheets

(56) References Cited

U.S. PATENT DOCUMENTS

| | | | |
|---|---|---|---|
| 9,177,209 B2 | 11/2015 | Chang et al. | |
| 9,330,426 B2 | 5/2016 | Davis | |
| 10,313,710 B1* | 6/2019 | Karlsson | H04N 21/2665 |
| 2009/0324199 A1 | 12/2009 | Haitsma et al. | |
| 2010/0061587 A1 | 3/2010 | Gupta | |
| 2013/0094771 A1* | 4/2013 | Chaudhuri | G11B 27/28 |
| | | | 382/224 |
| 2013/0163957 A1* | 6/2013 | Ikizyan | G06V 20/47 |
| | | | 386/E5.003 |
| 2014/0093164 A1* | 4/2014 | Noorkami | G06V 20/46 |
| | | | 382/165 |
| 2016/0210716 A1* | 7/2016 | Ghosh | G06T 1/0021 |
| 2020/0117911 A1 | 4/2020 | Lahr et al. | |

FOREIGN PATENT DOCUMENTS

| | | |
|---|---|---|
| CN | 104867161 A | 8/2015 |
| CN | 108010044 A | 5/2018 |
| WO | WO2018102014 A1 | 6/2018 |

OTHER PUBLICATIONS

Translation of Written Opinion dated Oct. 28, 2019, from corresponding PCT Application No. PCT/CN2019/099051 4 pages.
Extended European Search Report dated Apr. 5, 2022 for European Patent Application No. 19846876.1, 12 pages.
Massoudi, et al., "A Video Fingerprint Based on Visual Digest and Local Fingerprints", Image Processing, 2006 IEEE Conference, Oct. 1, 2006, pp. 2297-2300.

\* cited by examiner

METHOD AND APPARATUS FOR GENERATING VIDEO FINGERPRINT

CROSS REFERENCE TO RELATED PATENT APPLICATIONS

This application claims priority to and is a continuation of PCT Patent Application No. PCT/CN2019/099051 filed on 2 Aug. 2019, and is related to and claims priority to Chinese Application No. 201810905169.X, filed on 9 Aug. 2018 and entitled "Methods and Apparatuses for Generating Video Fingerprint," which are hereby incorporated by reference in their entirety.

TECHNICAL FIELD

The present disclosure relates to the technical field of video processing, and particularly to methods and apparatuses for generating video fingerprint.

BACKGROUND

In a website, different users may upload video files with the same content. Even the same user may upload video files with the same content multiple times. Therefore, the video files on the website may have serious duplication problems. In practical applications, video websites need to de-duplicate video files uploaded by users, so that video files with the same content can be de-duplicated when displaying search results to users.

An existing method for determining duplicate video files is an image hashing technology. Features need to be extracted from both training images and query images, which are then converted through a hash function and compressed into a certain number of coding sequences. Such process is called Hash encoding. A hash code so obtained is then used to calculate a Hamming distance. Candidate samples are sorted, i.e., rearranged, by Euclidean distances within a set Hamming distance threshold range, and retrieved images are finally returned. This method, however, has certain shortcomings. For tampering of video content, hash codes that are generated are very different, leading to a failure in retrieval of similar content. In other words, in a process of video file deduplication, these images with the same content are not considered as duplicate video files. In this way, a large number of missed detection problems exist for long video images that are cropped or rotated, etc.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/computer-readable instructions as permitted by the context above and throughout the present disclosure.

The present disclosure provides a method and an apparatus for generating a video fingerprint, which quickly and effectively solves the problem of detecting duplicated image content.

The adopted technical solutions are as follows.

In implementations, the present disclosure provides a method for generating a video fingerprint, which includes:
performing shot boundary detection on content of a video;
determining a time duration of each shot according to positional points of the shot boundary, and compose the time duration of each shot into a shot boundary time slice sequence; and
obtaining video fingerprint information according to the time slice sequence.

In implementations, obtaining the video fingerprint information according to the time slice sequence includes:
obtaining video fingerprint information of a current shot according to a difference between a time slice element of the current shot and a time slice element of an adjacent shot in the time slice sequence.

In implementations, obtaining the video fingerprint information of the current shot according to the difference between the time slice element of the current shot and the time slice element of the adjacent shot in the time slice sequence includes:
separately calculating quantized differences of the time slice element of the current shot with a time slice element of a previous shot and a time slice element of a next shot in the time slice sequence;
using the two quantized differences corresponding to the time slice element of the current shot as an index item of the element; and
using the index item of the time slice element of the current shot, a video sequence number of the video and a shot sequence number of a time slice of the shot as fingerprint information of the current shot.

In implementations, performing the shot boundary detection on the content of the video includes:
processing each image frame of the content of the video to obtain a grayscale image of a preset size;
calculating a normalized histogram of each image frame;
calculating a normalized cumulative histogram of each image frame;
calculating a difference between cumulative histograms of every two adjacent image frames to form a difference sequence;
smoothing the difference sequence using a window of a preset size;
calculating a standard deviation of the difference sequence within a time window whose time length is a preset length; and
determining that an image corresponding to a current window is a position of a shot boundary if a difference between a value of the current window and the standard deviation meets a preset condition.

In implementations, separately calculating the quantized differences of the time slice element of the current shot with the time slice element of the previous shot and the time slice element of the next shot in the time slice sequence includes:
using the following formula to calculate a quantized difference $f(T_i, T_{i-1})$ between the time slice element $T_i$ of the current shot and the time slice element $T_{i-1}$ of the previous shot in the time slice sequence:

$$f(T_i, T_{i-1}) = \text{floor}\left\{ \left[ \left( \frac{T_i - T_{i-1}}{T_i + T_{i-1}} + 1 \right) \Big/ 2 \right] \times 2^n \right\};$$

where floor( ) represents rounding down, n is a positive integer, 4≤n≤9.

In implementations, the method of obtaining the shot sequence number of the time slice of the shot includes:

determining the shot sequence number of the time slice of the current shot according to a ranking order of a time duration of the current shot in the shot boundary time slice sequence.

In implementations, the present disclosure provides an apparatus for generating a video fingerprint, which includes:

a boundary detection module configured to perform shot boundary detection on content of a video;

a time calculation module configured to determine a time duration of each shot according to positional points of the shot boundary, and compose the time duration of each shot into a shot boundary time slice sequence; and a fingerprint information module configured to obtain video fingerprint information according to the time slice sequence.

In implementations, obtaining the video fingerprint information according to the time slice sequence by the fingerprint information module includes:

obtaining video fingerprint information of a current shot according to a difference between a time slice element of the current shot and a time slice element of an adjacent shot in the time slice sequence.

In implementations, the fingerprint information module includes:

a quantized difference unit configured to separately calculate quantized differences of the time slice element of the current shot with a time slice element of a previous shot and a time slice element of a next shot in the time slice sequence;

a primary index unit configured to use the two quantized differences corresponding to the time slice element of the current shot as an index item of the element; and a secondary index unit configured to use the index item of the time slice element of the current shot, a video sequence number of the video and a shot sequence number of a time slice of the shot as fingerprint information of the current shot.

In implementations, performing the shot boundary detection on the content of the video by the boundary detection module includes:

calculating a normalized histogram of each image frame;

calculating a normalized cumulative histogram of each image frame;

calculating a difference between cumulative histograms of every two adjacent image frames to form a difference sequence;

smoothing the difference sequence using a window of a preset size;

calculating a standard deviation of the difference sequence within a time window whose time length is a preset length; and determining that an image corresponding to a current window is a position of a shot boundary if a difference between a value of the current window and the standard deviation meets a preset condition.

In implementations, separately calculating the quantized differences of the time slice element of the current shot with the time slice element of the previous shot and the time slice element of the next shot in the time slice sequence by the quantized difference unit includes:

using the following formula to calculate a quantized difference $f(T_i, T_{i-1})$ between the time slice element $T_i$ of the current shot and the time slice element of the previous shot in the time slice sequence:

$$f(T_i, T_{i-1}) = \mathrm{floor}\left\{\left[\left(\frac{T_i - T_{i-1}}{T_i + T_{i-1}} + 1\right)/2\right] \times 2^n\right\};$$

where floor( ) represents rounding down, n is a positive integer, $4 \leq n \leq 9$.

In implementations, the method of obtaining the shot sequence number of the time slice of the shot by the secondary index unit includes:

determining the shot sequence number of the time slice of the current shot according to a ranking order of a time duration of the current shot in the shot boundary time slice sequence.

Compared with existing technologies, the present disclosure has the following beneficial effects:

In the present disclosure, time durations of shots are used as a basis. A normalized difference quantization formula is used, and an obtained quantized difference sequence is an integer. A secondary inverted index structure is then used. A generated video fingerprint information code word is short, and has a high degree of anti-cropping and anti-rotation characteristics. It is also robust to other common types of video editing attacks. The shot detection technology used in the present solutions has a direct impact on a final result, but still has a considerable degree of tolerance for shot detection errors.

DETAILED DESCRIPTION

The technical solutions of the present disclosure will be described in more detail hereinafter with reference to the drawings and the embodiments.

It should be noted that, if no conflict exists, the embodiments of the present disclosure and various features in the embodiments can be combined with each other, and all fall within the scope of protection of the present disclosure. In addition, although a logical sequence is shown in a flowchart, in some cases, steps may be performed in a different order than those that are shown or described herein.

In a typical configuration, a device that performs video fingerprint generation and retrieval may include one or more processors (CPU), input/output interfaces, network interfaces, and memory.

The memory may include a form of computer readable media such as a volatile memory, a random access memory (RAM) and/or a non-volatile memory, for example, a read-only memory (ROM) or a flash RAM. The memory is example of a computer readable media. The memory may include one or more program modules.

The computer readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

Figure 1:
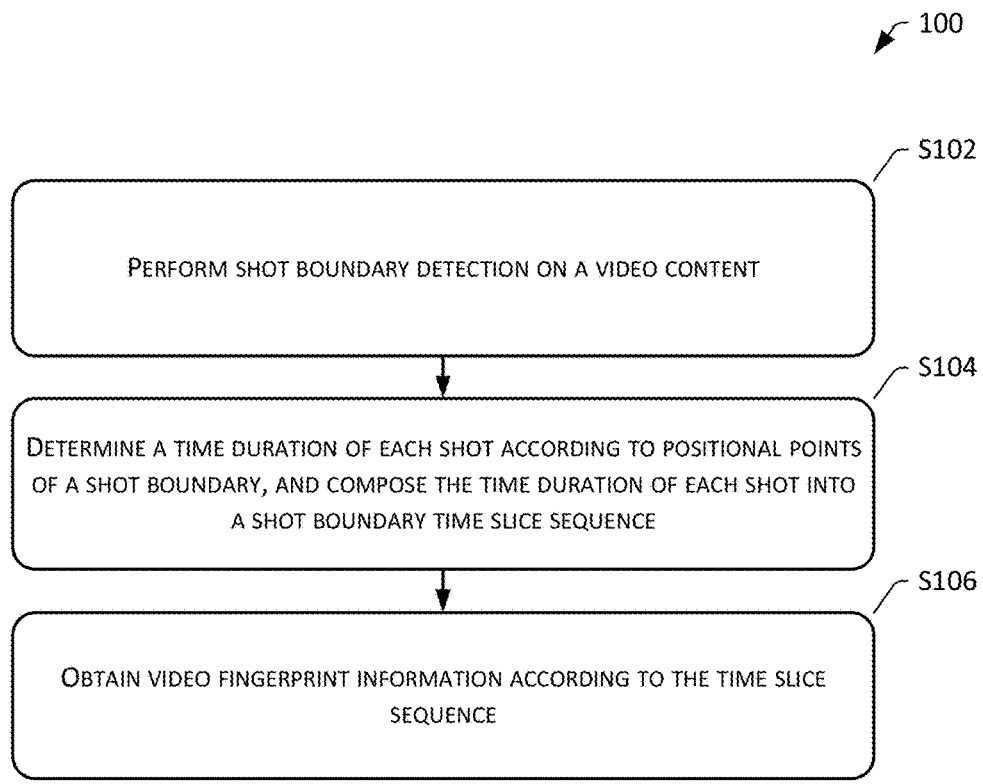
FIG. 1 is a flowchart of a video fingerprint generation method according to the embodiments of the present disclosure.
Figure 2:
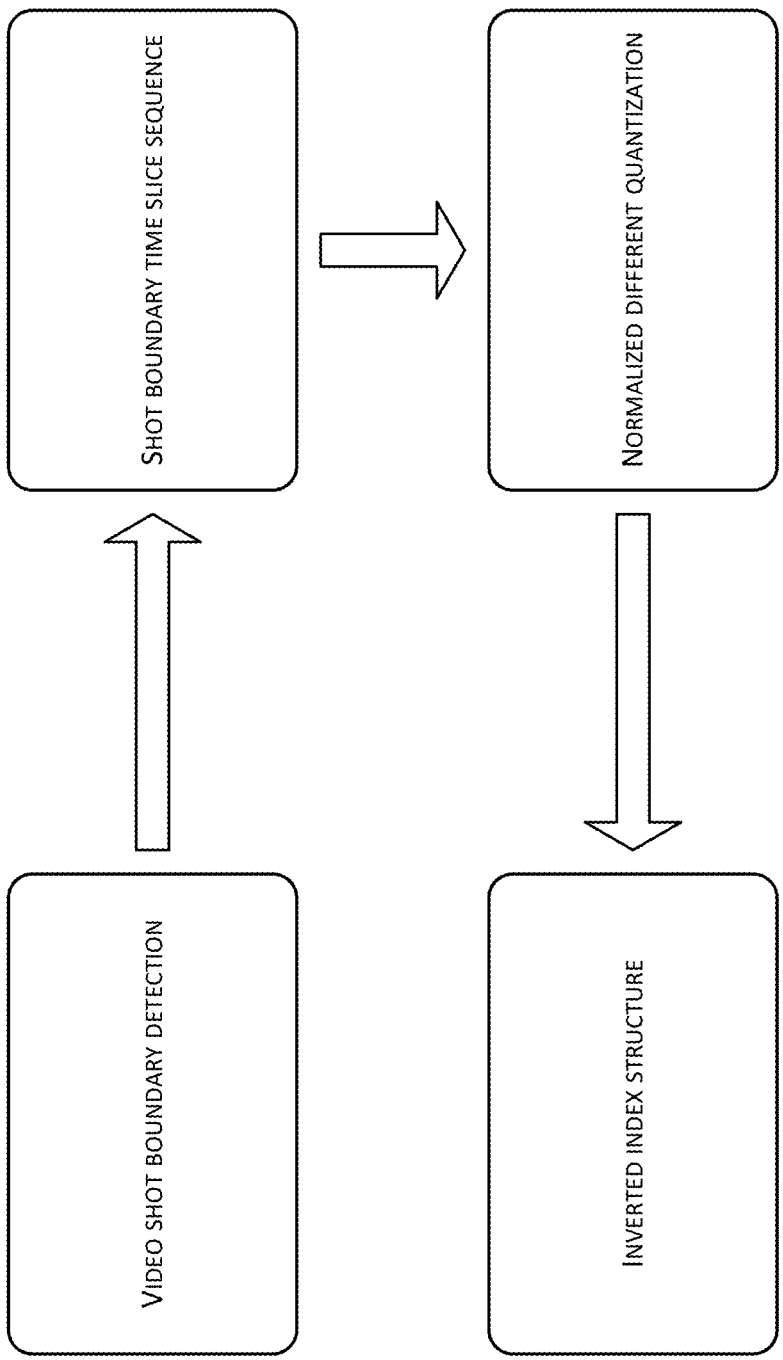
FIG. 2 is a schematic diagram of a video fingerprint generation process according to the embodiments of the present disclosure.

As shown in FIGS. 1 and 2, the embodiments of the present disclosure provide a method 100 for generating a video fingerprint, which includes:

S102: Perform shot boundary detection on a video content.

S104: Determine a time duration of each shot according to positional points of a shot boundary, and compose the time duration of each shot into a shot boundary time slice sequence.

S106: Obtain video fingerprint information according to the time slice sequence.

For a piece of video content, a relatively large number of scene switching exists due to manual editing at a later stage. A large number of manifestations of such type of scene switching exist, including, for example, sudden changes in shots, and scene switching in a form of scene transitions with some special effects. Relatively common types include a fade-in fade-out type, a transition with a mosaic effect, a transition with a blind effect, etc. Different video contents have different locations and frequencies of scene switching. If time positions of all scene switching of a piece of video content are accurately found, a time sequence is obtained. Correspondingly, any time sequence uniquely corresponds to a piece of video content.

The embodiments of the present disclosure perform shot boundary detection for detecting a position of scene switching. A premise of the above assumption is that a position of switching a movie scene needs to be accurately found. Further, shot boundary detection generally does not have a large impact due to cropping and rotation of image content. This means that the methods of the embodiments of the present disclosure are highly robust to cropping and rotation.

In the embodiments, at step S106, obtaining the video fingerprint information according to the time slice sequence includes:

obtaining video fingerprint information of a current shot according to a difference between a time slice element of the current shot and a time slice element of an adjacent shot in the time slice sequence.

In implementations, at step S102, performing the shot boundary detection on the video content includes:

using a cumulative-histogram-based method to perform the shot boundary detection on the video content.

In implementations, using the cumulative-histogram-based method to perform the shot boundary detection on the video content includes:

S1: Process each image frame of the video content to obtain a respective grayscale image of a preset size.

S2: Calculate a normalized histogram of each image frame.

S3: Calculate a normalized cumulative histogram of each image frame.

S4: Calculate a difference between cumulative histograms of every two adjacent image frames to form difference sequences.

S5: Perform smoothing processing on the difference sequences using a window of a preset size.

S6: Calculate a standard deviation of the difference sequences within a time window whose time length is a preset length.

S7: Determine that an image corresponding to a current window is a position of a shot boundary if a difference between a value of the current window and a standard deviation satisfies a preset condition.

Figure 3:
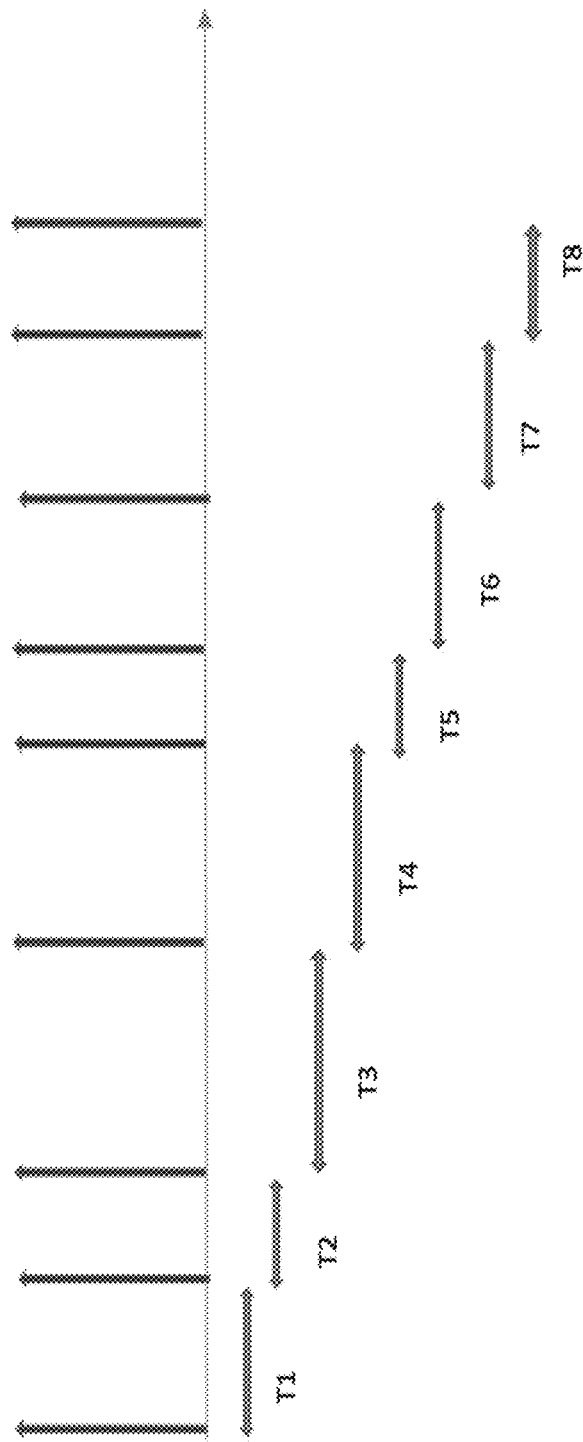
FIG. 3 is a schematic diagram of a shot boundary time slice sequence according to the embodiments of the present disclosure.

As shown in FIG. 3, an input video content is used as an example. The video content is examined and detected, and positions of shot boundaries that are obtained are shown by pulse arrows on a coordinate axis of FIG. 3. Time durations of each shot are shown by double-headed arrows that are below the coordinate axis of FIG. 3. The purpose of shot detection is to determine a time point of a change in shot for the input video content.

Figure 4:
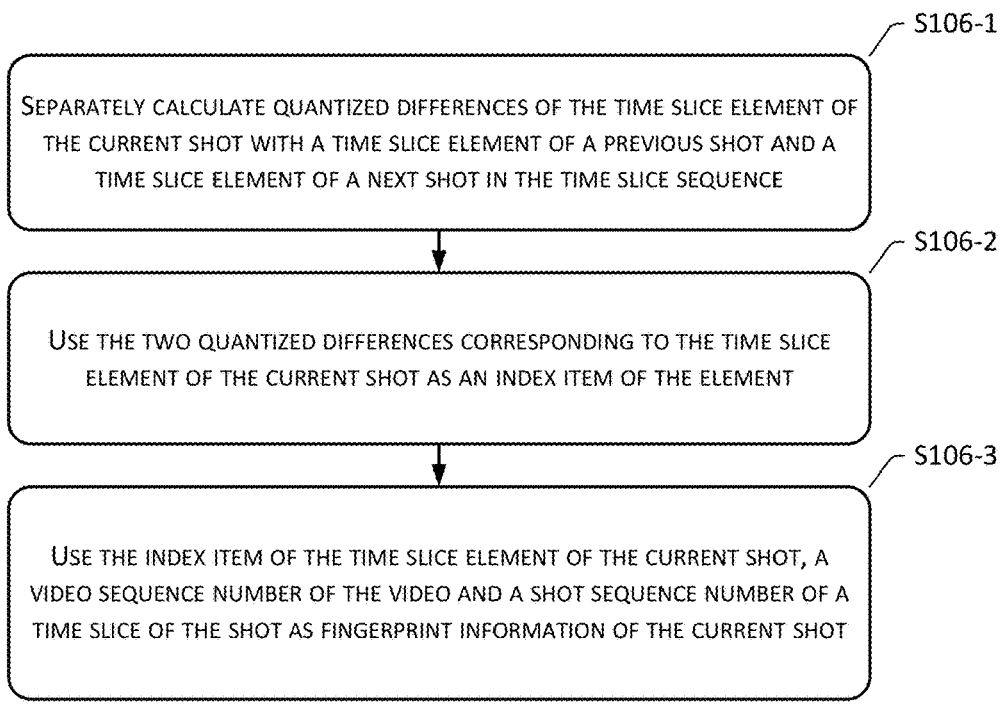
FIG. 4 is a schematic diagram of a normalized difference quantization process according to the embodiments of the present disclosure.

As shown in FIG. 4, in implementations, obtaining the video fingerprint information of the current shot according to the difference between the time slice element of the current shot and the time slice element of the adjacent shot in the time slice sequence at step S106, includes:

S106-1: Separately calculate quantized differences of the time slice element of the current shot with a time slice element of a previous shot and a time slice element of a next shot in the time slice sequence.

S106-2: Use the two quantized differences corresponding to the time slice element of the current shot as an index item of the element.

S106-3: Use the index item of the time slice element of the current shot, a video sequence number of the video and a shot sequence number of a time slice of the shot as fingerprint information of the current shot.

At step S106-1 in implementations, separately calculating the quantized differences of the time slice element of the current shot with the time slice element of the previous shot and the time slice element of the next shot in the time slice sequence includes:

using the following formula to calculate a quantized difference $f(T_i, T_{i-1})$ between the time slice element $T_i$ of the current shot and the time slice element $T_{i-1}$ of the previous shot in the time slice sequence:

$$f(T_i, T_{i-1}) = \text{floor}\left\{\left[\left(\frac{T_i - T_{i-1}}{T_i + T_{i-1}} + 1\right)\middle/2\right] \times 2^n\right\};$$

where floor( ) represents rounding down, n is a positive integer, $4 \leq n \leq 9$.

In implementations, a value range of $$\frac{T_i - T_{i-1}}{T_i + T_{i-1}}$$

is (−1, 1). After adding by 1, the value range is (0, 2). After dividing by 2, the value range is (0, 1). After multiplying by 2n, the value range is (0, 2n), which can be converted to n as a binary number. In implementations, n=6.

A method of obtaining the shot sequence number of the time slice of the shot includes:

determining the shot sequence number of the time slice of the current shot according to a ranking order of a time duration of the current shot in the shot boundary time slice sequence.

Second Embodiment

The present disclosure describes a process of shot boundary detection:

In implementations, a shot boundary detection method based on a cumulative histogram is adopted, and details of the process are as follows:

1.1. Normalize frame images of the video content to 256×256 grayscale images.

1.2. Calculate a normalized histogram, with each pixel being quantized to 6 bits during a process of calculating the histogram.

1.3. Calculate a normalized cumulative histogram.

1.4. Calculate a respective difference between cumulative histograms of two adjacent frames.

1.5. Perform Gaussian smoothing on difference sequences, with a size of a smoothing window being 3.

1.6. Calculate a standard deviation of the sequences of differences within a time window with a time length of 1 second, and consider a certain sequence to be a position of a shot boundary if a value thereof is 8 times greater than the standard deviation.

1.7. Move a position of the sliding window back by one frame, and return to 1.6 for execution, until the window reaches a final position.

Third Embodiment

The present disclosure describes a process of normalized difference quantization calculation using a time slice sequence.

Due to an existence of false detections and missed detections in shot detection, it is not possible to directly compare two time series obtained by shot detection of two videos. Moreover, in actual scenes, one of two identical videos may be cropped to a half only on a time axis, i.e., they are not aligned on the time axis. Therefore, the present disclosure uses three consecutive time slice sequences to generate features. These 3 time slice sequences are regarded as a time window. The time window then slides down. Two adjacent time windows overlap. The method used in implementations can deal with missed and false-detected shots.

The present disclosure uses a normalized difference quantization feature, and details of a calculation formula are as follows:

For time slice elements of any two adjacent shots, $$f(T_i, T_{i-1}) = \text{floor}\left\{\left[\left(\frac{T_i - T_{i-1}}{T_i + T_{i-1}} + 1\right)\Big/2\right] \times 64\right\};$$

where floor( ) means rounding down.

In implementations, an output is a 6-bit unsigned integer.

Time slice elements of three consecutive adjacent shots are calculated according to the above formula to obtain a 12-bit integer as a feature value, and the 12-bit unsigned integer is a constructed index item.

Figure 5:
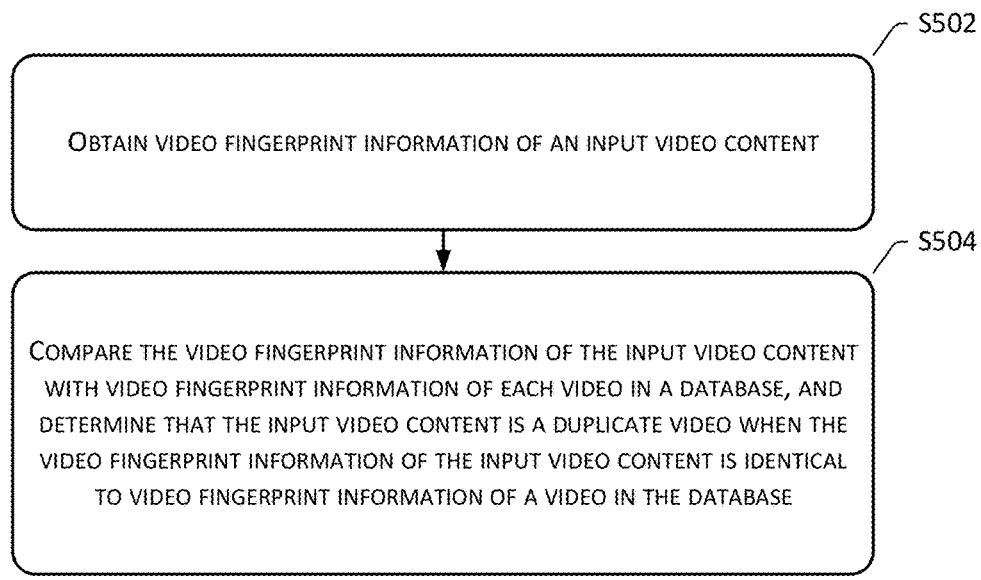
FIG. 5 is a flowchart of a video fingerprint retrieval method according to the embodiments of the present disclosure.

As shown in FIG. 5, the present disclosure provides an image fingerprint retrieval method 500, which includes:

S502: Obtain video fingerprint information of an input video content.

S504: Compare the video fingerprint information of the input video content with video fingerprint information of each video in a database, and determine that the input video content is a duplicate video when the video fingerprint information of the input video content is identical to video fingerprint information of a video in the database.

In implementations, the image fingerprint retrieval method 500 further includes:

The input video content and duplicated video(s) in the database are marked with a same label, so that one of the videos with the same label is selected for display according to a preset selection requirement when the video is displayed to the user.

For the input video content, multiple 12-bit unsigned integers are generated according to the above process to form a feature sequence. In a retrieval structure, fingerprint information of each shot includes not only a feature sequence, but also a shot sequence number of the respective shot and a corresponding video number. 12-bit integers can be used as indices in a hash table, and correspond to 4096 hash values. Every feature will be scattered into this hash table. Details of a memory structure are shown in Table 1 below:

TABLE 1

| Normalized quantization difference 0 | Video sequence number | Shot sequence number | . . . | Shot sequence number | Video sequence number | Shot sequence number | . . . | Shot sequence number |
|---|---|---|---|---|---|---|---|---|
| Normalized quantization difference 1 | Video sequence number | Shot sequence number | . . . | Shot sequence number | Video sequence number | Shot sequence number | . . . | Shot sequence number |
| . . . | . . . | . . . | . . . . . . | . . . | . . . | . . . | . . . . . . | |
| Normalized quantization difference 4095 | Video sequence number | Shot sequence number | . . . | Shot sequence number | Video sequence number | Shot sequence number | . . . | Shot sequence number |

With the above hash inverted structure, a retrieval task can be completed quickly. Specifically, all video sequence numbers and shot sequence numbers corresponding to a current feature are first obtained through a 12-bit integer. If multiple features are generated from a same video, and feature values of the database have been saved in a library, their corresponding video sequence numbers are the same, and the shot sequence numbers are incrementally increasing. According to this rule, a final desired result can be filtered and obtained.

Figure 6:
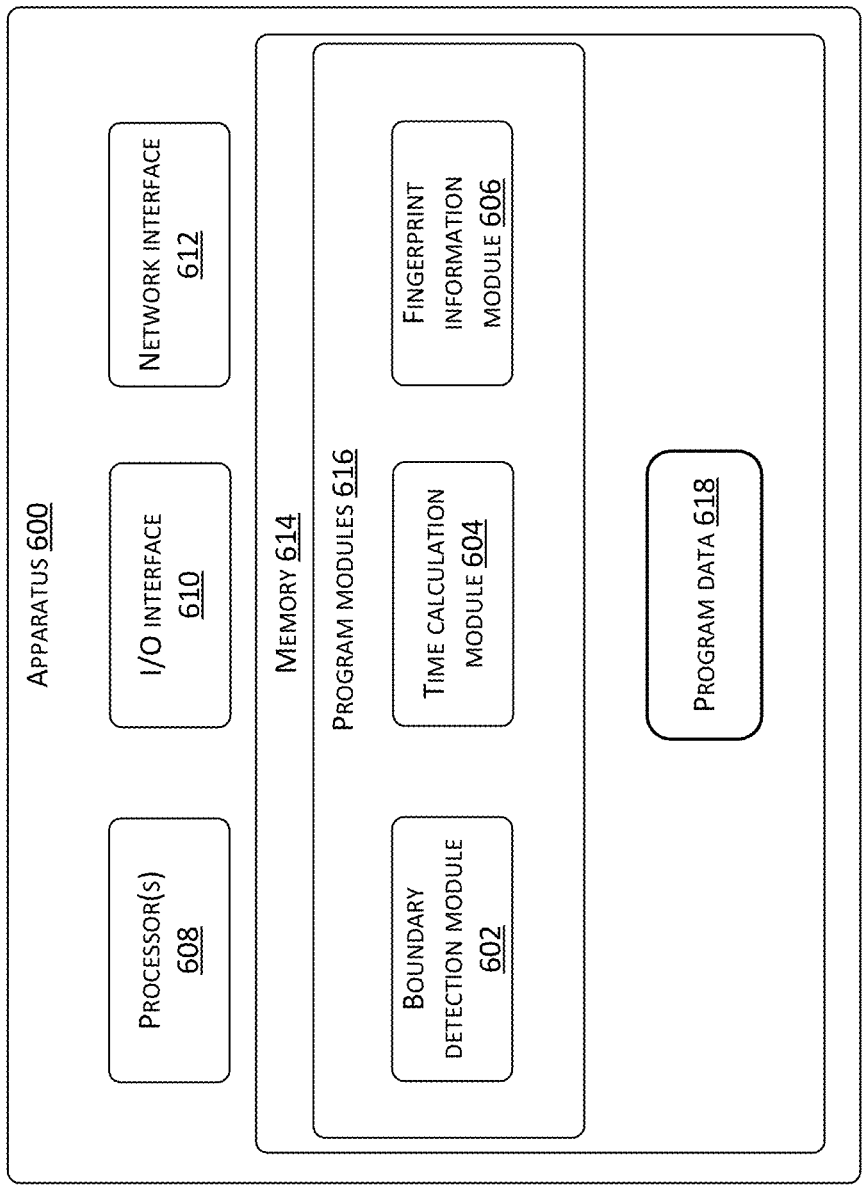
FIG. 6 is a schematic structural diagram of a video fingerprint generation apparatus according to the embodiments of the present disclosure.

As shown in FIG. 6, the present disclosure provides a video fingerprint generation apparatus 600, which includes:

a boundary detection module 602 configured to perform shot boundary detection on content of a video;

a time calculation module 604 configured to determine a time duration of each shot according to positional points of the shot boundary, and compose the time duration of each shot into a shot boundary time slice sequence; and a fingerprint information module 606 configured to obtain video fingerprint information according to the time slice sequence.

In implementations, obtaining the video fingerprint information according to the time slice sequence by the fingerprint information module 606 includes:

obtaining video fingerprint information of a current shot according to a difference between a time slice element of the current shot and a time slice element of an adjacent shot in the time slice sequence.

In implementations, performing the shot boundary detection on the content of the video by the boundary detection module 602 includes:

performing the shot boundary detection on the content of the video using a cumulative-histogram-based method.

Performing the shot boundary detection on the content of the video using the cumulative-histogram-based method by the boundary detection module 602 includes:

Processing each image frame of the video content to obtain a respective grayscale image of a preset size;

calculating a normalized histogram of each image frame;

calculating a normalized cumulative histogram of each image frame;

calculating a difference between cumulative histograms of every two adjacent image frames to form a difference sequences;

smoothing the difference sequences using a window of a preset size;

calculating a standard deviation of the difference sequences within a time window whose time length is a preset length; and determining that an image corresponding to a current window is a position of a shot boundary if a difference between a value of the current window and a standard deviation satisfies a preset condition.

In implementations, the apparatus 600 may further include one or more processors 608, an input/output (I/O) interface 610, a network interface 612, and memory 614.

The memory 614 may include a form of computer readable media such as a volatile memory, a random access memory (RAM) and/or a non-volatile memory, for example, a read-only memory (ROM) or a flash RAM. The memory 614 is an example of a computer readable media. In implementations, the memory 614 may include program modules 616 and program data 618. The program modules 616 may include one or more modules as described in the foregoing description and FIG. 6.

In implementations, the computer readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

Figure 7:
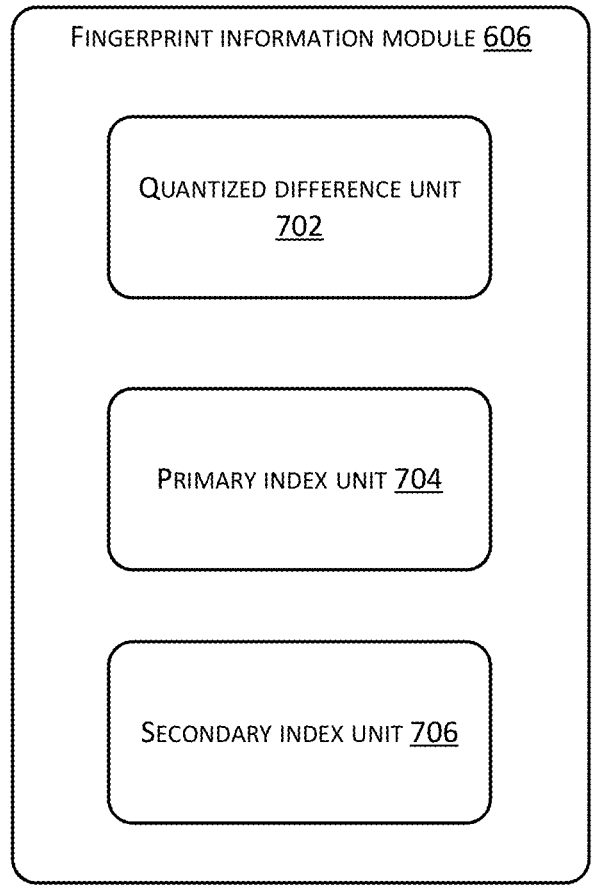
FIG. 7 is a schematic structural diagram of a fingerprint information module according to the embodiments of the present disclosure.

As shown in FIG. 7, the fingerprint information module 606 includes:

a quantized difference unit 702 configured to separately calculate quantized differences of the time slice element of the current shot with a time slice element of a previous shot and a time slice element of a next shot in the time slice sequence;

a primary index unit 704 configured to use the two quantized differences corresponding to the time slice element of the current shot as an index item of the element; and a secondary index unit 706 configured to use the index item of the time slice element of the current shot, a video sequence number of the video and a shot sequence number of a time slice of the shot as fingerprint information of the current shot.

Figure 8:
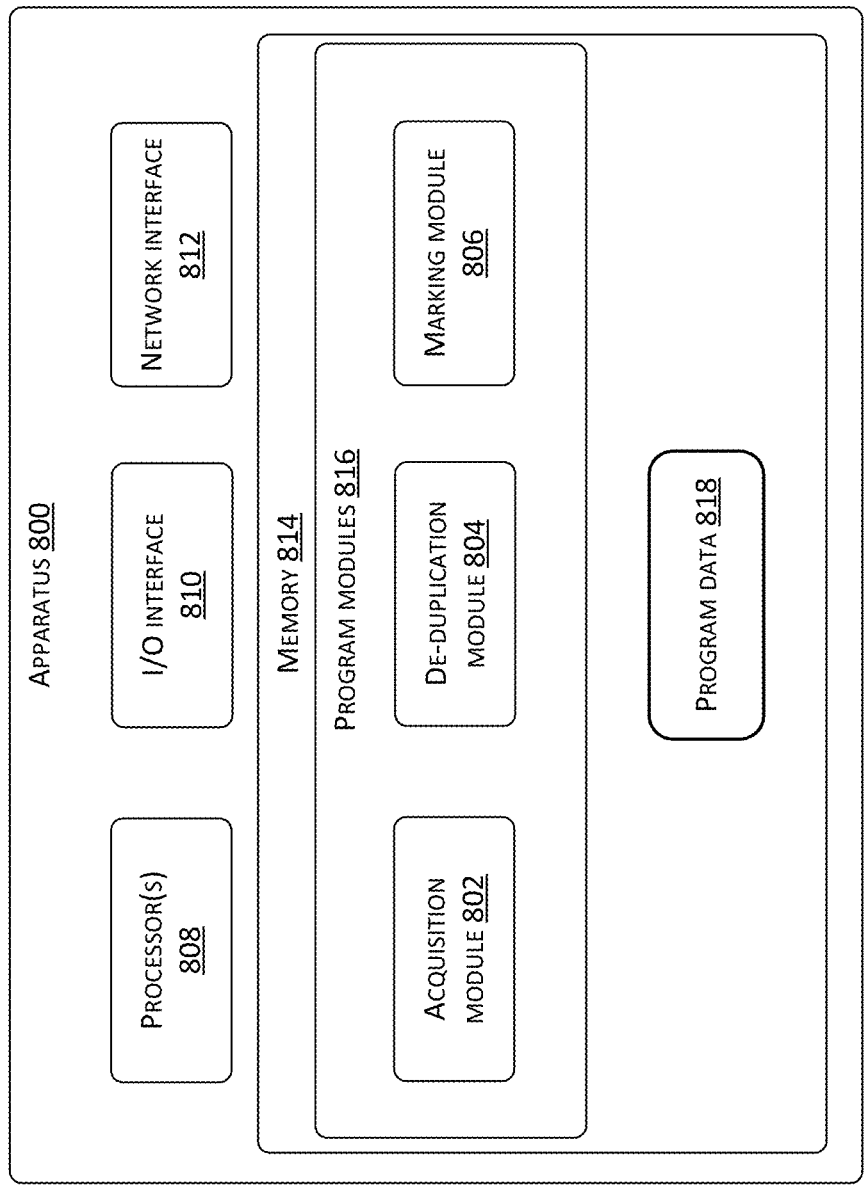
FIG. 8 is a schematic structural diagram of a video fingerprint retrieval apparatus according to the embodiments of the present disclosure.

As shown in FIG. 8, the present disclosure provides an image fingerprint retrieval apparatus 800, which includes:

an acquisition module 802 configured to obtain video fingerprint information of an input video content;

a deduplication module 804 configured to compare the video fingerprint information of the input video content with video fingerprint information of each video in a database, and determine that the input video content is a duplicated video when the video fingerprint information of the input video content is identical to video fingerprint information of a video in the database.

In implementations, the apparatus 800 further includes a marking module 806 configured to:

mark the input video content and duplicated video(s) in the database with a same label, so that one of the videos with the same label is selected for display according to a preset selection requirement when the video is displayed to the user.

In implementations, the apparatus 800 may further include one or more processors 808, an input/output (I/O) interface 810, a network interface 812, and memory 814.

The memory 814 may include a form of computer readable media as described in the foregoing description. In implementations, the memory 814 may include program modules 816 and program data 818. The program modules 816 may include one or more modules as described in the foregoing description and FIG. 8.

Although the embodiments disclosed in the present disclosure are described above, the content thereof are merely implementations used for facilitating the understanding of the technical solutions of the present disclosure, and are not intended to limit the present disclosure. One skilled in the technical field of the present disclosure can make any modifications and changes in the forms and details of implementations without departing from the core technical solutions disclosed in the present disclosure. However, the scope defined by the appended claims shall still be used as a basis for the scope of protection defined by the present disclosure.

The present disclosure can further be understood using the following clauses.

Clause 1: A method for generating a video fingerprint, comprising: performing shot boundary detection on content of a video; determining a time duration of each shot according to positional points of the shot boundary, and compose the time duration of each shot into a shot boundary time slice sequence; and obtaining video fingerprint information according to the time slice sequence.

Clause 2: The method of Clause 1, wherein obtaining the video fingerprint information according to the time slice sequence comprises: obtaining video fingerprint information of a current shot according to a difference between a time slice element of the current shot and a time slice element of an adjacent shot in the time slice sequence.

Clause 3: The method of Clause 2, wherein obtaining the video fingerprint information of the current shot according to the difference between the time slice element of the current shot and the time slice element of the adjacent shot in the time slice sequence comprises: separately calculating quantized differences of the time slice element of the current shot with a time slice element of a previous shot and a time slice element of a next shot in the time slice sequence; using the two quantized differences corresponding to the time slice element of the current shot as an index item of the element; and using the index item of the time slice element of the current shot, a video sequence number of the video and a shot sequence number of a time slice of the shot as fingerprint information of the current shot.

Clause 4: The method of Clause 1, wherein performing the shot boundary detection on the content of the video comprises: processing each image frame of the content of the video to obtain a grayscale image of a preset size; calculating a normalized histogram of each image frame; calculating a normalized cumulative histogram of each image frame; calculating a difference between cumulative histograms of every two adjacent image frames to form a difference sequence; smoothing the difference sequence using a window of a preset size; calculating a standard deviation of the difference sequence within a time window whose time length is a preset length; and determining that an image corresponding to a current window is a position of a shot boundary if a difference between a value of the current window and the standard deviation meets a preset condition.

Clause 5: The method of Clause 3, wherein separately calculating the quantized differences of the time slice element of the current shot with the time slice element of the previous shot and the time slice element of the next shot in the time slice sequence comprises: using the following formula to calculate a quantized difference $f(T_i, T_{i-1})$ between the time slice element $T_i$ of the current shot and the time slice element $T_{i-1}$ of the previous shot in the time slice sequence:

$$f(T_i, T_{i-1}) = \text{floor}\left\{\left[\left(\frac{T_i - T_{i-1}}{T_i + T_{i-1}} + 1\right)/2\right] \times 2^n\right\},$$

wherein floor( ) represents rounding down, n is a positive integer, $4 \leq n \leq 9$.

Clause 6: The method of Clause 3, wherein obtaining the shot sequence number of the time slice of the shot comprises: determining the shot sequence number of the time slice of the current shot according to a ranking order of a time duration of the current shot in the shot boundary time slice sequence.

Clause 7: An apparatus for generating a video fingerprint, comprising: a boundary detection module configured to perform shot boundary detection on content of a video; a time calculation module configured to determine a time duration of each shot according to positional points of the shot boundary, and compose the time duration of each shot into a shot boundary time slice sequence; and a fingerprint information module configured to obtain video fingerprint information according to the time slice sequence.

Clause 8: The apparatus of Clause 7, wherein obtaining the video fingerprint information according to the time slice sequence by the fingerprint information module comprises: obtaining video fingerprint information of a current shot according to a difference between a time slice element of the current shot and a time slice element of an adjacent shot in the time slice sequence.

Clause 9: The apparatus of Clause 8, wherein the fingerprint information module comprises: a quantized difference unit configured to separately calculate quantized differences of the time slice element of the current shot with a time slice element of a previous shot and a time slice element of a next shot in the time slice sequence; a primary index unit configured to use the two quantized differences corresponding to the time slice element of the current shot as an index item of the element; and a secondary index unit configured to use the index item of the time slice element of the current shot, a video sequence number of the video and a shot sequence number of a time slice of the shot as fingerprint information of the current shot.

Clause 10: The apparatus of claim 7, wherein performing the shot boundary detection on the content of the video by the boundary detection module comprises: calculating a normalized histogram of each image frame; calculating a normalized cumulative histogram of each image frame; calculating a difference between cumulative histograms of every two adjacent image frames to form a difference sequence; smoothing the difference sequence using a window of a preset size; calculating a standard deviation of the difference sequence within a time window whose time length is a preset length; and determining that an image corresponding to a current window is a position of a shot boundary if a difference between a value of the current window and the standard deviation meets a preset condition.

Clause 11: The apparatus of Clause 9, wherein separately calculating the quantized differences of the time slice element of the current shot with the time slice element of the previous shot and the time slice element of the next shot in the time slice sequence by the quantized difference unit comprises: using the following formula to calculate a quantized difference $f(T_i, T_{i-1})$ between the time slice element $T_i$ of the current shot and the time slice element of the previous shot in the time slice sequence:

$$f(T_i, T_{i-1}) = \text{floor}\left\{\left[\left(\frac{T_i - T_{i-1}}{T_i + T_{i-1}} + 1\right)/2\right] \times 2^n\right\},$$

wherein floor( ) represents rounding down, n is a positive integer, $4 \leq n \leq 9$.

Clause 12: The apparatus of Clause 8, wherein obtaining the shot sequence number of the time slice of the shot by the secondary index unit comprises: determining the shot sequence number of the time slice of the current shot according to a ranking order of a time duration of the current shot in the shot boundary time slice sequence.

What is claimed is:

1. A method implemented by one or more computing devices, the method comprising:

performing shot boundary detection on content of a video;
determining a time duration of each shot according to positional points of a shot boundary, and compose the time duration of each shot into a shot boundary time slice sequence; and
obtaining video fingerprint information according to the time slice sequence, wherein obtaining the video fingerprint information according to the time slice sequence comprises:
  obtaining video fingerprint information of a current shot according to a difference between a time slice element of the current shot and a time slice element of an adjacent shot in the time slice sequence, obtaining the video fingerprint information of the current shot comprising:
    separately calculating quantized differences of the time slice element of the current shot with a time slice element of a previous shot and a time slice element of a next shot in the time slice sequence;
    using the quantized differences corresponding to the time slice element of the current shot as an index item of the time slice element of the current shot; and
    using the index item of the time slice element of the current shot, a video sequence number of the video and a shot sequence number of a time slice of the current shot as the video fingerprint information of the current shot.

2. The method of claim 1, wherein obtaining the shot sequence number of the time slice of the current shot comprises:
  determining the shot sequence number of the time slice of the current shot according to a ranking order of a time duration of the current shot in the shot boundary time slice sequence.

3. The method of claim 1, wherein performing the shot boundary detection on the content of the video comprises:
  processing each image frame of the content of the video to obtain a grayscale image of a preset size;
  calculating a normalized histogram of each image frame;
  calculating a normalized cumulative histogram of each image frame; and
  calculating a difference between cumulative histograms of every two adjacent image frames to form a difference sequence.

4. The method of claim 3, wherein performing the shot boundary detection on the content of the video further comprises:
  smoothing the difference sequence using a window of a predefined size;
  calculating a standard deviation of the difference sequence within a time window whose time length is a preset length.

5. The method of claim 4, wherein performing the shot boundary detection on the content of the video further comprises:
  determining that an image corresponding to a current window is a position of the shot boundary if a difference between a value of the current window and the standard deviation meets a preset condition.

6. An apparatus comprising:
one or more processors;
memory storing executable instructions that, when executed by the one or more processors, cause the one or more processors to perform acts comprising:
  performing shot boundary detection on content of a video, wherein performing the shot boundary detection on the content of the video comprises:
    calculating a normalized histogram of each image frame;
    calculating a normalized cumulative histogram of each image frame; and
    calculating a difference between cumulative histograms of every two adjacent image frames to form a difference sequence;
    smoothing the difference sequence using a window of a preset size;
    calculating a standard deviation of the difference sequence within a time window whose time length is a preset length;
  determining a time duration of each shot according to positional points of a shot boundary, and composing the time duration of each shot into a shot boundary time slice sequence; and
  obtaining video fingerprint information according to the time slice sequence.

7. The apparatus of claim 6, wherein obtaining the video fingerprint information according to the time slice sequence comprises:
  obtaining video fingerprint information of a current shot according to a difference between a time slice element of the current shot and a time slice element of an adjacent shot in the time slice sequence.

8. The apparatus of claim 7, wherein obtaining the video fingerprint information of the current shot comprises:
  separately calculating quantized differences of the time slice element of the current shot with a time slice element of a previous shot and a time slice element of a next shot in the time slice sequence;
  using the two quantized differences corresponding to the time slice element of the current shot as an index item of the time slice element of the current shot; and
  using the index item of the time slice element of the current shot, a video sequence number of the video and a shot sequence number of a time slice of the current shot as fingerprint information of the current shot.

9. The apparatus of claim 8, wherein obtaining the shot sequence number of the time slice of the current shot comprises:
  determining the shot sequence number of the time slice of the current shot according to a ranking order of a time duration of the current shot in the shot boundary time slice sequence.

10. The apparatus of claim 6, wherein performing the shot boundary detection on the content of the video further comprises:
  determining that an image corresponding to a current window is a position of the shot boundary if a difference between a value of the current window and the standard deviation meets a preset condition.

11. One or more computer readable media storing executable instructions that, when executed by one or more processors, cause the one or more processors to perform acts comprising:
  performing shot boundary detection on content of a video;
  determining a time duration of each shot according to positional points of a shot boundary, and compose the time duration of each shot into a shot boundary time slice sequence; and obtaining video fingerprint information according to the time slice sequence, wherein obtaining the video fingerprint information according to the time slice sequence comprises:

obtaining video fingerprint information of a current shot according to a difference between a time slice element of the current shot and a time slice element of an adjacent shot in the time slice sequence, wherein obtaining the video fingerprint information of the current shot comprises:

separately calculating quantized differences of the time slice element of the current shot with a time slice element of a previous shot and a time slice element of a next shot in the time slice sequence;

using the quantized differences corresponding to the time slice element of the current shot as an index item of the time slice element of the current shot; and using the index item of the time slice element of the current shot, a video sequence number of the video and a shot sequence number of a time slice of the current shot as the video fingerprint information of the current shot.

12. The one or more computer readable media of claim 11, wherein obtaining the shot sequence number of the time slice of the current shot comprises:

determining the shot sequence number of the time slice of the current shot according to a ranking order of a time duration of the current shot in the shot boundary time slice sequence.

13. The one or more computer readable media of claim 11, wherein performing the shot boundary detection on the content of the video comprises:

processing each image frame of the content of the video to obtain a grayscale image of a preset size;

calculating a normalized histogram of each image frame;

calculating a normalized cumulative histogram of each image frame; and calculating a difference between cumulative histograms of every two adjacent image frames to form a difference sequence.

14. The one or more computer readable media of claim 13, wherein performing the shot boundary detection on the content of the video further comprises:

smoothing the difference sequence using a window of a predefined size;

calculating a standard deviation of the difference sequence within a time window whose time length is a preset length; and determining that an image corresponding to a current window is a position of the shot boundary if a difference between a value of the current window and the standard deviation meets a preset condition.

* * * * *